Dec. 8, 1964   M. S. LIPKINS   3,159,947
SPHERICAL CUTTING APPARATUS
Original Filed Feb. 24, 1959
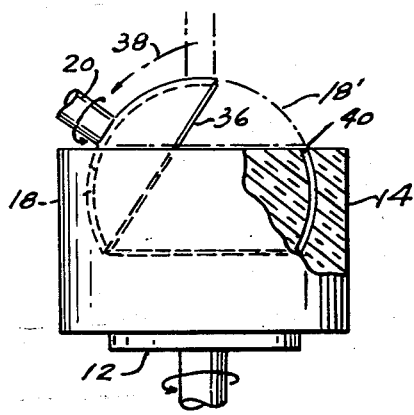
FIG. 1
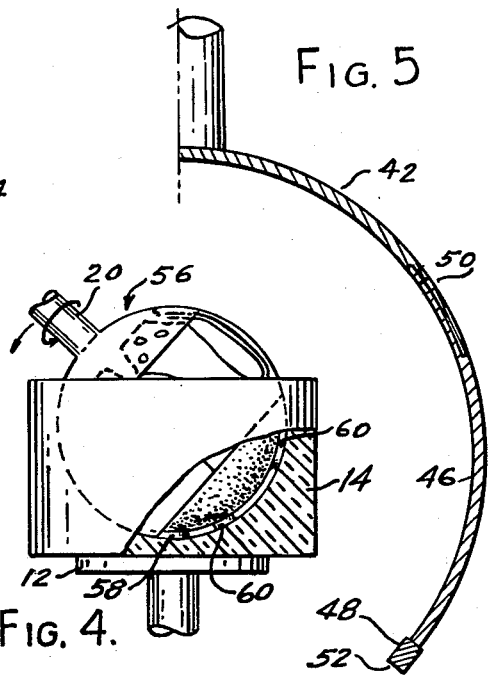
FIG. 5
FIG. 4.
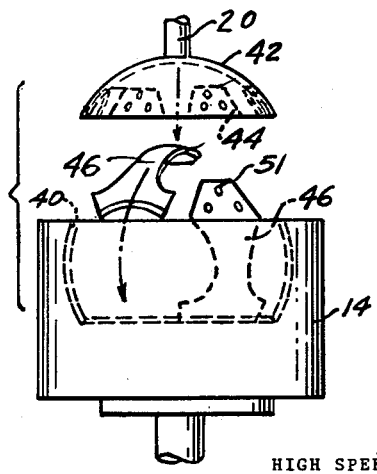
FIG. 2
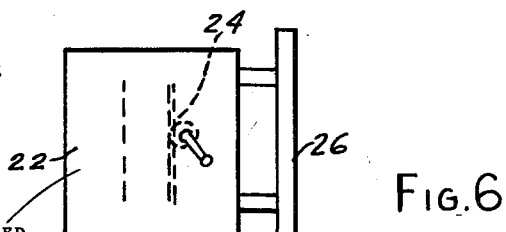
HIGH SPEED
ROTARY DRIVE UNIT
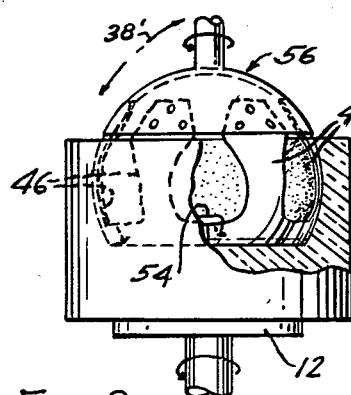
FIG. 3
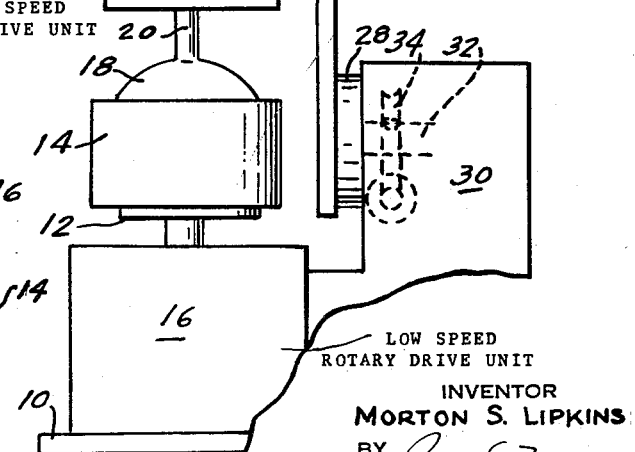
FIG. 6
LOW SPEED
ROTARY DRIVE UNIT
INVENTOR
MORTON S. LIPKINS
BY
ATTORNEY

3,159,947
SPHERICAL CUTTING APPARATUS
Morton S. Lipkins, 3 Nemeth St., Malverne, N.Y.
Original application Feb. 24, 1959, Ser. No. 795,212, now Patent No. 3,088,253, dated May 7, 1963. Divided and this application June 25, 1962, Ser. No. 205,830
4 Claims. (Cl. 51—33)

The present invention relates to apparatus for making spherical cuts in fracturable materials, and to apparatus for cutting a spherical part from a body of fracturable material and at the same time providing a spherical hollow in the body of material. This application is a division of my copending application, Ser. No. 795,212, filed Feb. 24, 1959, now Patent No. 3,088,253 issued May 7, 1963.

This invention has special application to the manufacture of domes of hard, fracturable materials, having both inside and outside spherical surfaces. These have heretofore been made by casting crude domes as of quartz, or by starting with solid single crystals as of silicon and germanium, in both cases removing the unwanted material by various types of grinding operations. An enormous amount of grinding is involved and, in the case of costly materials, such grinding represents the conversion of large amounts of costly recoverable solid materials into almost worthless waste.

An object of the present invention is to avoid much of the waste, and to greatly reduce the extent of the grinding operation involved (as measured by volume of material reduced to bits) in making the spherical surface or surfaces desired. A further object is to avoid much of the waste of material heretofore involved in grinding away the unwanted material in the course of making spherical shapes.

Features of the invention reside in the provision of novel spherical diamond-edged cutters for forming objects of hard, fracturable materials with inside or outside spherical surfaces, or both inside and outside spherical surfaces; and a particular feature and object of the invention resides in the provision of novel apparatus for cutting spherical surfaces in hard, fracturable materials that approach or are even greater than a hemisphere.

In the illustrative embodiment of the invention described in detail below, a diamond-edged cutter with a spherical carrier of approximately the same radius as the desired cut is rotated about an axis, which is swung gradually through an angle to increase its penetration into the body of material being cut, the body being rotated at a moderate rate compared to the speed of cutter rotation. The ultimate penetration of such a cutter is limited by engagement of its supporting shaft with the face of the material. In order to make a hemispherical or larger cut, the described embodiment of the invention utilizes a first spherical cutter of less than hemispherical extent, i.e., hypohemispherical, to make a zonal cut into the material; and thereafter a multi-part cutter of greater than hemispherical extent is assembled into the previous cut and is operated to complete the cut.

The cutter operates by breaking fine chips away from the fracturable material. Its operation is characterized by bringing successive parts of the diamond-cutting edge to the cutting point, at relatively high linear speed. The body of material progressively rotates, to cause the cutting point to advance in a circle in the body; and the cutting circle changes in diameter as the axis of cutter rotation swings relative to the axis of rotation of the material being cut.

Relatively light pressure is entailed in cutting; but as the cut-off point is approached, support is provided for the inner portion, to avoid an uncontrolled fracture occurring where a regular cut-off surface is wanted. The inner part of the body being cut can be supported by an adherent support, similar to the support of the body itself, where there is no interference between the cutter and the support. However, there is special advantage in joining the inner and outer parts of the cut body, completing the cut-off operation by continuing rotation of the cutter axis relative to the previous axis of rotation of the cut body, interrupting rotation of the fracturable body during this cut-off phase of the operation.

The nature and further details and features of the invention will be better appreciated from the following description of the presently preferred embodiment of the various aspects of the invention shown in the accompanying drawings, which form part of this disclosure. In the drawings:

FIG. 1 is an elevation, partly in section, of a hypohemispherical cutter illustrating its operation on a rotationally supported body;

FIG. 2 is an elevation of the body cut as in FIG. 1, illustrating the manner of assembly of the parts of a hyperhemispherical cutter;

FIG. 3 is a view of the body, partly in section, with the hyperhemispherical cutter in condition to starts its operation;

FIG. 4 is a view similar to FIG. 3, nearing completion of the operation of the hyperhemispherical cutter;

FIG. 5 is an enlarged cross-section through one-half of the hyperhemispherical cutter through the axis thereof in the plane of FIG. 3; and FIG. 6 is the lateral view of spherical cutting apparatus, for the cutters shown in FIGS. 1–5.

The apparatus in FIG. 6 includes a base 10 that carries a support 12 for a body 14 of material to be cut. The base 10 has a rotary drive unit 16 for driving support 12 at slow speed about a vertical axis. Drive unit 16 may be stopped while the other drives continue to operate.

Above body 14 is a spherical diamond-edged cutter 18 carried by shaft 20 in a drive head 22 (see FIG. 6). Cutter 18 is driven at relatively high rotational speeds, chosen to give proper lineal cutting speed for the diamond cutting edge. Head 22 not only contains a variable speed drive, but it also contains a vertical rack-and-pinion arrangement 24 for endwise adjusting the position of shaft 20. The entire head 22 and its adjustment 24 may be of the conventional construction found in electrically driven drill presses, for example.

Head 22 is carried on a plate 26 that has a rotational bearing 28 on an upstanding part 30 of the apparatus containing shaft 32, and suitable drive means for low speed operation. Bearing 28 and shaft 32 fix the axis of head 22, to swing about a horizontal axis passing through the intersection of the axes of support 12 and shaft 20. (In the special condition when both shaft 20 and support 12 have vertical axes, those axes technically coincide rather than intersect.) Adjustment 24 accommodates spherical cutters 18 of different radii, disposing each cutter with its center of curvature along the axis of shaft 32. In usual operation, the drive mechanism for swinging plate 26 about the horizontal axis of shaft 32 is a very slow drive, compared even to the relatively slow speed of drive 16.

The apparatus of FIG. 6 is useful for making spherical cuts, particularly in fracturable hard materials such as fused quartz, silicon and germanium. FIGS. 1–4 illustrate the operation of this apparatus for making a hyperhemispherical cut in a cylindrical body 14 of such material. A spherical cutter 18 having a cutting edge 36 of diamond dust imbedded in a suitable metal carrier so as to constitute a diamond cutter is shown in dot-dash lines in FIG. 1 at a limiting starting position designated 18'. The cutting edge 36 is a circle that is approximately equal to the size of the intersection of the spherical cut to be made with the top surface of body 14. The proportions illustrated in FIG. 1 involve a cutter 18 having a plane included angle of roughly 120 degrees. The edge of the cutter in its starting position 18' (FIG. 1) lies along a radius from the center of the spherical surface that is approximately 60 degrees away from the axis of shaft 20 of the cutter. This shaft extends from the outside or convex surface of the cutter whose inside surface is free and unobstructed throughout the spherical supporting surface of the cutter except, optionally, for a limited space at the inside spherical surface directly opposite shaft 20 where some slight projection can be tolerated so long as it does not interfere with the top surface of the body 14 when the cutter reaches its limiting position shown in solid lines.

The cutter is rotated at high speed about the axis of shaft 20, while support 12 is slowly turned, and a cutting lubricant is fed to the cutting edge of the cutter. Progressively, the initially vertical axis of shaft 20 is swung, very gradually, in the direction represented by arrow 38. If it be assumed that the plane angle of cutter 18 is 120 degrees and its cut is started with shaft 20 vertical and with cutting edge 36 against the top of the body 14, and if shaft 20 subtends a plane angle of roughly 20 degrees, then cutter is capable of penetrating about 50 degrees into the body 14 as shaft 20 is swung toward the top surface of body 14. In this condition, a zonal cut 40 has been made that includes a great circle in the plane that is perpendicular to the rotational axis of support 12 at the center of curvature of the cutter. The upper and lower limits of the cut, being roughly 20 degrees above and 30 degrees below this transverse plane, measured in the plane of the drawing, represents what may be called an "equatorial zonal cut." The depth of the cut is limited by the interference between shaft 20 and the top of the body 14. When its limit of penetration is reached, cutting is interrupted and the cutter is removed from the cut.

In FIGS. 2, 3 and 5 the details of a hyperhemispherical cutter are illustrated, which are suitable for completing the spherical cut commenced as illustrated in FIG. 1. This cutter includes a spherically curved cap 42 carried by a shaft 20, cap 42 having a series of recesses 44 in its concave surface for receiving segmental cutter elements 46. These elements are of the same thickness as cap 42 except in the region of recesses 44, where the elements 46 are received in overlapping relation (FIG. 5) so as to constitute of elements 46 and 42 a spherical support for the several segmental diamond cutters 48 that are unitary parts of the respective elements 46. Screws 50 fasten elements 42 and 46 together separably, and elements 46 have corners (51) or other suitable keying formations so that they are properly oriented in relation to cap 42 and thereby to each other, so that segmental diamond-cutting edges 48 form a circle. The face 52 (FIG. 5) of each cutting edge is disposed in a conical surface whose apex is at the center of the spherical surface. Cutting face 52 is wider than the thickness of elements 46 and 42, to afford clearance between the cut and the supporting surfaces of the cutter edges. Cutter 18 in FIG. 1 has similar diamond-cutting edge detail, with its cutting face disposed in a conical surface whose apex is at the center of curvature, and the cutting face of the cutter in FIG. 1 is similarly wider than the thickness of the spherical support for the actual cutting edge. Like the cutter of FIG. 1, the spherical cutter 56 of FIGS. 2–5, inclusive, is capable of operation by swinging relative to the rotational axis of support 12 in the manner represented by arrow 38' (FIG. 3) until shaft 20 reaches the top surface of body 14.

The multi-part cutter is assembled as represented in FIG. 2 by moving the cutter elements 46 successively into the cut started as in FIG. 1. In FIG. 2 elements 46 actually reach the bottom of the cut. In that condition, the segmental cutters 46 form a circle that matches the circle at the bottom of cut 40. The abutting edges of the cutters 48 may be formed so as to interlock with each other when so assembled, in any convenient fashion. Dovetail joints may be used, or a bridging hooked member 54 (FIG. 3) carried by one element 46 and received in a corresponding hole in the companion adjacent element 46. The last element 46 to be inserted will carry interlocks for both the flanking elements 46 previously inserted. Such interlock is desirable where high rotational speed is required, for restraining the segmental cutters against undue centrifugal spreading.

The cutting operation using the hyperhemispherical cutter 56, assembled of the parts 42 and 46 as described, continues until a small uncut central neck of the material being cut remains, designated 58 in FIG. 4. It is desired to guard against fracture at neck 58 that might damage the sphericity of the inside wall of the cut, or the outside wall of the cut. Also, the inner part that would become free at the completion of the cutting operation and would contact the cutter which would be rotating at high speed at that time, so that the separated part inside the spherical cutter could well shatter. To guard against such damage, the inside portion of body 14 may be supported, as indicated in FIG. 4, through the use of inserted material 60 at a number of places, bonded to both faces of the cut. Thereafter, rotation of support 12 is discontinued as the axis of shaft 20 of cutter 56 continues its high-speed rotation and gradual swinging motion until the cutting edges cross the axis about which support 12 previously rotated, and sufficiently therebeyond to complete the cut-off. This technique of providing the internal piece that is being cut out of the body 14 is of evident special merit. However, the support can be provided in various ways, as by bonding a support to the top face of the inner piece in cases where interference can be avoided between such support and the cutter. Where material 60 is used in the cut, that material can be removed after completion of the cut through the use of an appropriate solvent.

Successive cutting operations may be carried out, using spherical cutters of different spherical radii, to form the inside and outside surfaces of a dome, as one of the presently important applications of the invention. It will be recognized that some waste is involved in the making of the cut; but some minimum width of cut is desirable both for adequate strength of the spherical support for the cutting edges in the spherical cutters described, and for insuring clearance to enable removal of the finished piece, in the case of a hyperhemispherical shape. Despite this limited waste, however, a great saving can be realized as compared to procedures involving the grinding away of the entire volume of material not wanted.

The foregoing specific illustrative disclosure of a preferred embodiment of an invention in its various aspects will naturally be subject to a latitude of variation and varied application. Consequently, this invention should be broadly construed in accordance with its full spirit and scope.

What is claimed is:

1. Apparatus for making spherical cuts in fracturable materials, including a spherical cutter having a diamond edge and spherical support means carried by an outwardly projecting shaft, the thickness of said support means being less than that of said diamond edge outside the portion thereof occupied by said shaft, said shaft occupying only a small fraction of the solid angle of the cutter, rotary drive means coupled to said shaft, a rotary support for a body of fracturable material to be cut, the axes of rotation of said support and said cutter lying in a common plane, and means supporting and driving said cutter shaft and said body support for relative swinging of the axes thereof about a third axis perpendicular to said plane from one position of alignment with each other to another position approaching right-angular relationship.

2. Apparatus for making spherical cuts in fracturable materials, including a wide-angled spherical cutter having a diamond cutting edge, a spherical cutting-edge support no thicker than the diamond cutting edge and a supporting shaft projecting centrally from the convex side of said spherical cutting-edge support, said shaft occupying only a narrow angled part of said wide-angled cutter and said support being internally free of obstruction against penetration of the cutter into the face of a body to be cut, means for supporting a body of fracturable material to be cut for rotation about an axis, drive means for rotating said cutter shaft rapidly compared to the rotational speed of said body support, and gradually driven support means for swinging said cutter shaft relative to said support axis from a position of alignment to another position in the same plane approaching right-angled relationship.

3. Apparatus for making spherical cuts in fracturable materials, including a cutter having a spherical wall, a circular diamond-bearing cutting edge and an outward projecting shaft, rotary drive means coupled to said shaft, a rotary support for a body of fracturable material to be cut, rotary drive means for said support, and means fixing said rotary support and said cutter so that the axes of rotation thereof intersect at the spherical center of the cutter, said last-named means having angular operating means arranged to change the angular relationship of said axes gradually through a relatively wide angle during cutter operation.

4. Apparatus for making spherical cuts in hard materials, including a cutter having a cap member, a series of cutter elements disposed to form parts of a spherical surface and secured to said cap member, each of said cutter elements having a fastening portion secured to said cap member and a segmental diamond cutting sector, the cutting sectors of said elements being disposed at one side of a great circle of said spherical surface along a minor circle thereof and the fastening portions of said cutter elements being disposed at the opposite side of said great circle, a supporting and driving shaft fixed to said cap member and projecting outward relative to said spherical surface, rotary drive means coupled to said shaft, a rotary support for a body of fracturable material to be cut, rotary drive means for said support, means fixing said rotary support and said cutter so that the rotary axes thereof intersect at the spherical center of the cutter, said last-named means having angular operating means arranged to change the angular relationship of said axes gradually through a relatively wide angle during cutter operation.

References Cited in the file of this patent
UNITED STATES PATENTS

| | | |
|---|---|---|
| 335,890 | Call | Feb. 9, 1886 |
| 501,404 | Brenner | July 11, 1893 |
| 922,649 | Williams et al. | May 25, 1909 |
| 2,552,164 | Foss | May 8, 1951 |
| 2,775,854 | Klingspor | Jan. 1, 1957 |
| 2,807,914 | Pascal et al. | Oct. 1, 1957 |

FOREIGN PATENTS

| | | |
|---|---|---|
| 140,627 | Sweden | Mar. 12, 1953 |